3,706,823
PURIFICATION OF ALKARYL PHOSPHATES
Gordon A. Rampy, Nitro, and Norman C. Parsons and Mabel H. Ryder, St. Albans, W. Va., assignors to FMC Corporation, New York, N.Y.
No Drawing. Filed Aug. 24, 1970, Ser. No. 66,553
Int. Cl. C07f 9/08, 9/12
U.S. Cl. 260—990    2 Claims

ABSTRACT OF THE DISCLOSURE

Hindered phenol impurities which cause color development in alkaryl phosphates—e.g. 2,6-dialkylphenols—are removed by reaction with excess $PCl_5$ to form the alkaryl phosphoric chlorides, which are then removed from the alkaryl phosphate by treatment with water, preferably combined with alkali.

BACKGROUND OF THE INVENTION

Field of the invention

This invention relates to the purification of alkaryl phosphates which contain color-imparting hindered phenol impurities.

Description of the prior art

Alkaryl phosphates have been extensively used for many years as plasticizers for nitrocellulose and poly(vinyl chloride) compositions, as gasoline additives, as functional fluids, as oil additives, etc. Until recently, the primary raw material had been by-product alkylphenols from coal tar acids and petroleum tars, such as cresols and xylenols. As the demand for the phosphates has risen with the growth of the consuming industries, alkaryl phenols have been made by alkylation of phenol. The resultant alkylated phenols are mixtures of unreacted phenol, ortho-, meta- and para-alkylphenol; 2,6-, 2,4-, 2,5- and 3,5-dialkylphenol; and 2,4,6- and 2,3,5-trialkylphenol. The relative amounts of each depend on the method and extent of alkylation. The preferred alkylation additive is the isopropyl radical, since it is possible to readily obtain phosphate esters very similar and in some ways superior in properties to the widely used tricresyl phosphate; however, the same problems arise with other lower alkyl radicals, such as methyl, ethyl and the various butyl and amyl radicals.

Conventionally, the alkylated phenols are reacted with $POCl_3$ by heating in the presence of a Friedel-Crafts catalyst to temperatures of about 180° C.; the reaction product is distilled to remove unreacted phenol as a forecut and the alkaryl phosphate as a product cut, leaving high boilers and catalyst. The product cut is washed with alkali to remove free phenol and other acids, and then generally treated with active carbon to remove color bodies.

This process, which works very well with conventional by-product alkylphenols, produces unsatisfactory material when applied to mixed alkylphenols produced by alkylation of phenol; the products discolor on exposure to air and heat. It has been found that this discoloration is due to the presence of di(o-alkyl)phenols in the phenol. The double ortho substitution in 2,6-dialkylphenol and in 2,4,6-trialkylphenols renders the phenols almost inert under ordinary reaction conditions due to steric hindrance so they are not removed by the caustic wash. These so-called hindered phenols, under proper conditions, readily form highly-colored quinones, which are the source of the undesirable discoloration in the product. As little as 50 parts per million (p.p.m.) of 2,6-diisopropylphenol in a trialkaryl phosphate will produce a badly discolored product.

OBJECT OF THE INVENTION

This invention aims to provide a process for removing color-producing hindered phenols from phosphate produced from phenol mixtures containing such phenols, which process is effective and economical.

STATEMENT OF THE INVENTION

In accordance with our invention, phosphates made from phenols containing hindered color-producing phenols are reacted with sufficient $PCl_5$ to convert all the free phenols present to phosphorus compounds containing readily hydrolyzable chlorine, and then hydrolyzing these compounds and washing out the resultant phenylphosphoric acids and HCl with aqueous alkali. For reasons of economy, the reaction with $PCl_5$ is preferably run on the dry phosphate which has been separated from the bulk of the free phenol, and from the catalyst, by the normal distillation process.

DETAILED DESCRIPTION OF THE INVENTION

This invention is applicable to all phosphate esters which are made from alkylated phenols which contain hindered phenols—e.g. phenols containing alkyl groups on both positions ortho to the hydroxyl. The esters may contain 1 to 3 alkaryl groups, and 0 to 2 alkyl groups, or aryl groups not substituted by alkyl, but can contain no unreacted phenolic hydroxyl; they have the general formula

where R is alkaryl, and $R_1$ and $R_2$ may be alkyl, aryl, or alkaryl.

The phenols which contain hindered phenols are typically those made by alkylating phenol with unsaturated hydrocarbons such as ethylene, propylene, the butylenes and amylenes, or with alcohols such as ethyl, propyl, butyl or amyl. The invention is hereinafter exemplified by phenols made by alkylating phenol with propylene; those alkylated phenols produce esters which are very similar to those produced with conventional by-product tar acids, and are most generally acceptable to the trade, which has developed its techniques on those products.

The esters are made in conventional fashion, by reacting the phenol (and alkyl radical, generally as alkoxide acting on the partial aryl ester, where a mixed alkyl-aryl ester is desired) with $POCl_3$ in the presence of a Friedel-Crafts catalyst by heating to the desired temperature, typically about 180° C. The reaction mixture is then heated to distill excess phenol overhead, the temperature and/or vacuum is then increased, and the product is distilled, leaving catalyst and high boilers.

Conventionally, the product would be washed with aqueous alkali to remove free phenols, which are generally present in the range of about a few tenths of one percent; the decanted product would be treated with active carbon and a filter aid such as diatomaceous earth, and filtered. However, if as little as 50 p.p.m. of hindered phenols are present in the product, discoloration in the presence of heat and air will ensue, rendering the product unfit for use in plastics as a plasticizer and flame retardant.

In accordance with this invention, the product is treated with $PCl_5$, which reacts rapidly with hydroxyl compounds to form HCl and various phosphorochloridates. With water, an excess of $PCl_5$ produces $POCl_3$ and HCl; with an excess of water, the products are $H_3PO_4$ and HCl. With phenols, an excess of $PCl_5$ reacts according to the formula

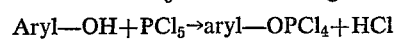

These reactions will occur at room temperature, without added catalyst.

Obviously, economic considerations suggest that the reaction be carried out with the minimum free hdroxyl present in the product—i.e., after distillation, and separation of most of the phenol overhead.

$PCl_5$ is apparently not selective with respect to its reactivity with hydroxyls, and enough must be added to react with all the free hydroxy in the product. Most preferably, the $PCl_5$ is added in equimolar ratio to the free hydroxy present; this prevents the formation of poly-substituted aryloxyphosphorus chlorides, which would tend to be more resistant to subsequent hydrolysis than the monosubstituted compounds. The actual dosage required can be estimated by the formula Percent $PCl_5$ required = 1.2 × total phenol percent + 4 × water percent However, it is desirable to have a margin of safety, because of analytical problems.

Typically, a phosphate ester will contain less than 0.1% of moisture, and about 0.2% of free phenol; with such typical ester, a 1% $PCl_5$ treatment gives a substantial margin of safety.

The $PCl_5$ treatment may be run at room temperature, but the distillate is hot (generally between 100 and 150° C.) and it is preferably treated at this temperature for about 15 to 60 minutes.

The mixture is then quenched with water, and stirred to hydrolyze the aryl-phosphorus chlorides to aryl-phosphoric acids and HCl. Satisfactory hydrolysis is obtained with equal volumes of water, a temperature of 75 to 95° C., and contact times of 15 to 30 minutes, with good mixing. With lower temperatures and poor mixing, longer times are required.

The phases are then separated, and the product is washed with alkali to remove HCl and aryl-phosphoric acids, as the alkali metal salt. Sodium hydroxide and sodium carbonate are the preferred alkalis on economic grounds. The neutralized product is washed with water, treated with active carbon and a filter aid, and filtered.

In the water treatments, it is desirable to add small amounts of chelating agents, to prevent precipitation of trace metals in the product.

The purification treatments must obviously be conducted in equipment resistant to wet HCl, or contamination of product will result.

SPECIFIC EXAMPLES OF THE INVENTION

The following specific examples of the invention are given by way of illustration and not by way of limitation.

In the examples, the following test methods were employed:

(a) Color.—Colors below 100% platinum-cobalt (Pt. Co) were measured according to ASTM Method D268-49 which employs a series of Pt–Co solutions in Nessler tubes as standards for comparison.

At higher levels of color, a commercial comparator (Lovibond) was used.

(b) Moisture—A Beckman "Aquameter" employing the classical Karl Fischer titration was used to determine moisture.

(c) Phenols.—Phenols were determined by vapor phase chromatography. The method is capable of detecting 10 p.p.m. of a phenol in phosphate ester.

(d) Vinyl yellowing.—The tendency for the phosphate ester to yellow poly(vinyl chloride) formulations was measured by oven-curing a mixture of poly(vinyl chloride) resin, phosphate ester and stabilizer and comparing the resutling specimen color with standards of varying yellowness. The colors were graded on a scale from 0 (white) to 5 (bright yellow). A color of 1 or 0 is considered acceptable performance for a commercial plasticizer.

EXAMPLE 1

A 400-gram batch of distilled isopropylphenyl phosphate prepared from phenol alkylated with propylene, and containing hindered phenols, was heated and mixed in a beaker with 4.0 grams of phosphorus pentachloride at 120 to 140° C. for 20 minutes. Approximately 300 ml. of water were then added and the mixture was heated and stirred to maintain contact between the organic and aqueous phases. Mixing was continued for 30 minutes at a temperature of 95 to 100° C.

The phases were separated in a separatory funnel and the organic (lower) phase was heated and mixed with 300 ml. of 2% (w./v.) sodium hydroxide solution for 10 minutes at 70 to 80° C. One milliliter of a solution of triethanolamine (TEA) and ethylenediaminetetraacetic acid (EDTA) was added to the alkali solution as a chelating agent to prevent precipitation of iron, an impurity present in the distilled phosphate ester.

After separating the organic phase from the aqueous phase in a separatory funnel, the ester was mixed and heated with distilled water for 10 minutes at 70 to 80° C. Four drops of the chelating agent (TEA–EDTA) were added to prevent iron precipitation.

The phases were again separated and the ester was heated and mixed with distilled water for 10 minutes at 70 to 80° C.

After separating the phases, the organic phase was heated and mixed with 2 grams of activated carbon and 2 grams of filter clay ("Superfiltrol"). The temperature of the mixture was allowed to increase to 125 to 135° C. to drive off moisture. It was then suction-filtered immediately through "Hi-Flo" filter aid in a Buchner funnel, using a water aspirator for vacuum.

The product was cooled and tested. The results of analysis and performance in the "plastisol test" are shown in Table I.

The starting material used in this example was essentially dry (0.02% moisture) and the treatment with 1% of phosphorus pentachloride effectively removed all traces of phenols and produced satisfactory color and vinyl plastisol performance.

EXAMPLE A (FOR COMPARISON)

A 400-gram batch of distilled isopropylphenyl phosphate which had been stored in an open vessel for an extended period, was treated as described in Example 1. The results of analysis and performance in the "plastisol test" are shown in Table I.

The starting material used in this example contained substantially more moisture than that used in Example 1, due to the prolonged storage. As a result, phenolic impurities were only partially removed and ester color and performance in the "plastisol test" were not acceptable. This example indicates the importance of excess $PCl_5$ over hydroxyl in the raw product.

EXAMPLE 2

Three 200-gram batches of a distilled isopropylphenyl phosphate were treated. The first was not treated with phosphorus pentachloride, or with the water wash which normally follows that treatment, but was washed with 2% of alkali, then twice with distilled water, dried with ½% of carbon and ½% of filter clay and filtered as otherwise described in Example 1.

The second batch was treated with 1% of phosphorus pentachloride and then was washed, dried and filtered using the procedures and reagent proportions described in Example 1.

The third batch was treated with 2% of phosphorus pentachloride and then was washed, dried and filtered using the procedures and reagent proportions described in Example 1.

The results of analysis and performance in the "plastisol test" are shown in Table I.

The starting material used in this example contained a high level of moisture (0.44%). The batch which was alkali-washed without prior phosphorus pentachloride treatment produced a highly-colored product which had a strong tendency to yellow when used as a vinyl plasticizer. Only a small portion of the original 2,6-diisopropylphenol content had been removed. The batch treated with 1% of phosphorus pentachloride was much improved in color, plasticizer performance and phenol content, but remained unacceptable because not enough $PCl_5$ had been used to react with all of the hydroxyl ions in the product. The third batch, treated with 2% of phosphorus pentachloride, was free of impurities, was low in color and performed well in the "plastisol test."

ated phenols with $POCl_3$ and have then been purified by distillation, but still contain as impurities phenols which are hindered by the presence of alkyl groups in both positions ortho to the hydroxyl group, which comprises treating the impure esters with at least 1 mol of $PCl_5$ for each mol of free OH in the impure ester, to convert the phenols to aryl-phosphoro-chloridates, hydrolyzing the aryl-phosphoro-chloridates to alkali-soluble arylphosphoric acids and hydrochloric acid, neutralizing the acids and washing them out of the phosphate ester to produce a product substantially free of hindered phenol.

2. The method of claim 1, in which the phosphate ester is a triaryl phosphate derived from an alkylated phenol made by alkylating phenol with propylene.

TABLE I.—PHOSPHORUS PENTACHLORIDE TREATMENT OF DISTILLED, IMPURE ISOPROPYLPHENYL PHOSPHATES

| | Moisture (percent) | Phenolic impurities (p.p.m.) | | | | | | | | Color, Pt-Co | Viny "Plastisol test"[2] |
|---|---|---|---|---|---|---|---|---|---|---|---|
| | | Phenol | 2-IPP | 3+4-IPP | 2,6-DIPP[1] | 2,4-DIPP | 2,5-+3,5-DIPP | 2,4,6-TIPP[1] | 2,3,5-TIPP | | |
| Example 1: | | | | | | | | | | | |
| Feedstock | 0.02 | 241 | 268 | 34 | 110 | 20 | N.D. | 55 | N.D. | | |
| Treated, 1% $PCl_5$ | | N.D. | N.D. | N.D. | N.D. | N.D. | N.D. | N.D. | N.D. | 50 | 1 |
| Example A: | | | | | | | | | | | |
| Feedstock | 0.27 | 327 | 237 | 29 | 148 | 29 | N.D. | 47 | 29 | | |
| Treated, 1% $PCl_5$ | | N.D. | 96 | 22 | 88 | 14 | N.D. | 36 | N.D. | 250 | 2 |
| Example 2: | | | | | | | | | | | |
| Feedstock | 0.44 | 227 | 235 | 23 | 141 | 15 | N.D. | 47 | N.D. | | |
| Alkali only | | N.D. | 148 | 17 | 124 | 17 | N.D. | 59 | 5 | 300 | 3 |
| Treated, 1% $PCl_5$ | | N.D. | 46 | N.D. | 85 | 7 | N.D. | 30 | N.D. | 100 | 2 |
| Treated, 2% $PCl_5$ | | N.D. | N.D. | N.D. | N.D. | N.D. | N.D. | N.D. | N.D. | 20 | 0 |

[1] Hindered phenol.
[2] Scale: "0"=white; "5"=bright yellow.

Note.—IPP=Isopropylphenol; DIPP=Diisopropylphenol; TIPP=Triisopropylphenol; N.D.=Not detected.

Obviously, the examples can be multiplied indefinitely, without departing from the scope of the invention as defined in the claims.

We claim:

1. The method of purifying phosphate esters of the formula

where R is alkaryl, and $R_1$ and $R_2$ are alkaryl, aryl or alkyl, which esters have been prepared by reacting alkyl-

References Cited

UNITED STATES PATENTS

| 1,869,312 | 7/1932 | Granger | 260—990 X |
| 1,931,059 | 10/1933 | Clemmensen | 260—990 |
| 2,184,697 | 12/1939 | Havemann et al. | 260—990 |

LEWIS GOTTS, Primary Examiner

R. L. RAYMOND, Assistant Examiner

U.S. Cl. X.R.

260—975, 976